United States Patent [19]

Gelbart

[11] Patent Number: 4,950,890

[45] Date of Patent: Aug. 21, 1990

[54] METHOD AND APPARATUS FOR CORRECTING POSITION ERRORS USING WRITABLE ENCODERS

[75] Inventor: Daniel Gelbart, Burnaby, Canada

[73] Assignee: Creo Electronics Corp., Burnaby, Canada

[21] Appl. No.: 218,164

[22] Filed: Jul. 13, 1988

[51] Int. Cl.$^5$ .............................................. H01J 3/14
[52] U.S. Cl. ........................... 250/237 G; 250/231.13
[58] Field of Search ........ 250/231 SE, 237 G, 237 R, 250/236, 239, 560; 350/6.7, 6.8; 356/386, 387

[56] References Cited

U.S. PATENT DOCUMENTS 4,079,251 3/1978 Osann, Jr. ...................... 250/231 SE
4,122,336 10/1978 Pomerantz ...................... 250/237 R
4,152,588 5/1979 Klatt et al. ...................... 250/237 G Primary Examiner—David C. Nelms

[57] ABSTRACT

A method and apparatus for correcting position errors, both linear and rotary is disclosed. In this method a blank encoder is mounted on the system and the position of the part to be controlled is measured. Lines are written on the blank encoder corresponding to equal increments of the position of the controlled part rather than equal increments on the encoder. In this method many of the system positional errors are cancelled. The blank encoder is made of laser recordable material and the writing is achieved by forming a beam of a laser diode into a line. Reading is achieved using the same optical system at a lower power level.

3 Claims, 1 Drawing Sheet

METHOD AND APPARATUS FOR CORRECTING POSITION ERRORS USING WRITABLE ENCODERS

BACKGROUND OF THE INVENTION

The invention relates to positioning systems and in particular to using a writeable encoder to correct position errors. The writeable encoder can be of the magnetic or optical type.

Encoders, both optical and magnetic, are used for accurate linear and rotary positioning of machine tools, computer peripherals and electro optical instruments. In most of the applications the point of position measurement does not coincide with the point where the accuracy is required. This is due mainly to restriction in mounting the encoders. As an example, when a linear encoder is used in a machine tool it is mounted below the table surface for protection. Any deviation from straightness of the ways will cause the table position to disagree with the encoder reading. Also, any distortion caused to the encoder while mounting it or due to the difference in thermal expansion between the encoder material and the machine tool will cause position errors. It is the object of this invention to write the encoder in place automatically compensating for all the above mentioned sources of error.

SUMMARY OF THE INVENTION

This and other objects are achieved in accordance with the invention which is a long flexible strip of laser writeable material permanently bonded to the moving part of a machine and a laser diode based read/write head permanently mounted to the stationary part of the same machine. An accurate position transducer such as a laser interferometer is used only once to measure the position of the moving part and command the encoder to write lines at positions corresponding to the actual positions of the moving part. After this calibration is complete the position is determined by reading the encoder in a conventional manner.

BRIEF DESCRIPTION OF THE DRAWINGS

These and other features of the invention are delineated in detail in the following description. In the drawings.

DETAILED DESCRIPTION

Figure 1:
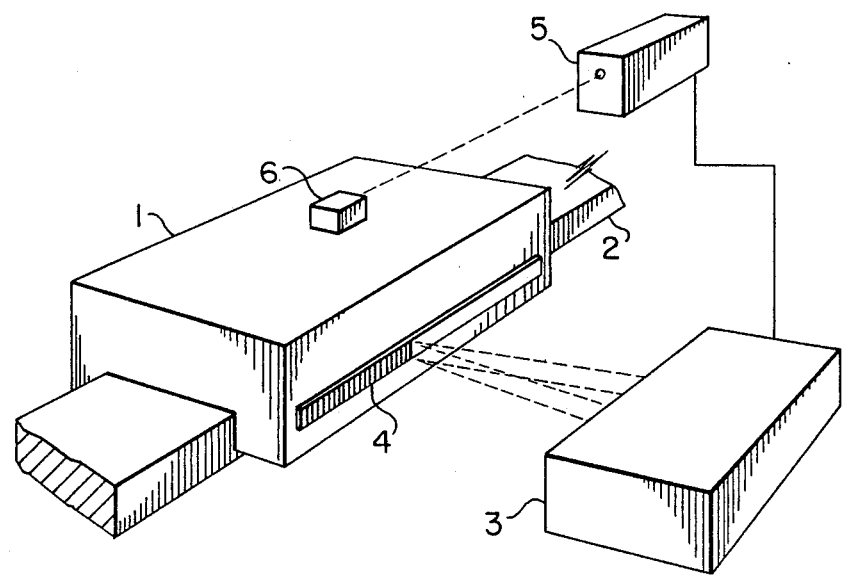
FIGS. 1 and 2 are schematic illustrations of one embodiment of the invention. It will be appreciated that for the purpose of illustration the different parts of this figure are not necessarily drawn to scale.
Figure 2:
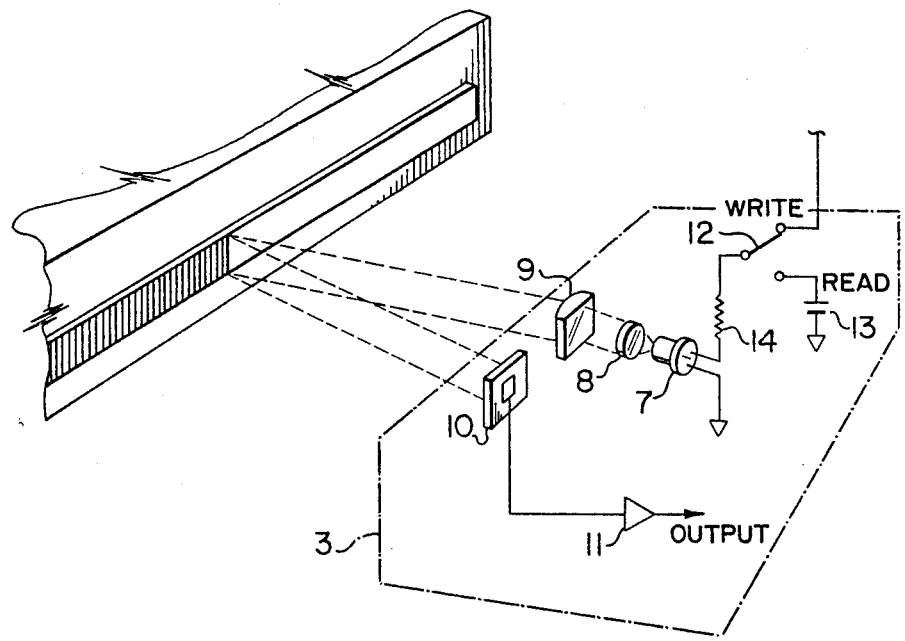

The invention will now be described with reference to FIG. 1. The position of the moving part 1 of a machine relative to the stationary part 2 is measured using a linear encoder 4. Since parts 1 and 2 are not perfectly straight any angular deviation during travel causes an error between the position of the top of part 1 and the encoder position. By the way of example, part 1 is a table of a machine tool. The accuracy is required at the top of this table while the encoder is mounted at a different level. According to this invention a flexible strip of blank laser writeable material is permanently bonded to part 1 and forms the linear encoder 4. The encoder is written in place by measuring the position of part 1 using a laser interferometer 5 and a mirror 6. For each small increment in the position of part 1 interferometer 5 sends an electrical pulse to the laser read/write head 3 causing a line to be permanently marked on 4. After the calibration is done mirror 6 and interferometer 5 are no longer required and could be removed. Since the flexible linear encoder 4 is permanently bonded to part 1 it will expand and contract together with it during temperature changes and will, in effect, have the same temperature coefficient as part 1.

The laser read/write head uses principles well known in writeable optical discs. Light from laser diode 7 is collimated by lens 8 and formed into a line on encoder 4 using cylindrical lens 9. During writing the laser diode is driven at a high power level, by the way of example 100 mW, by pulses from interferometer 5. After encoder 4 is fully written switch 12 is switched to the read position, in which the laser is driven at a lower power level, by the way of example 10 mW, from power source 13 via resistor 14. The laser light is reflected from encoder 4 onto photodetector 10. The reflected light is being modulated by the presence of the written lines. Amplifier 11 amplifies the signal from detector 10 to a standard logic level. The interferometer 5 and mirror 6 are no longer used.

The laser writeable material can be similar to those used in writeable optical discs. Particularly suitable for this application is the material named DREXON manufactured by Drexler Technology Corporation of Mountain View, Calif. This material is available as a long and narrow strip and can be bonded to the measured parts using a commercial adhesive, such as epoxy resin. For example, using this material and the laser read/write head described lines about 10 micron wide on 20 micron centers can be written. Line length is about 1 mm.

It will also be noted that the principle of the invention does not change if the linear encoder strip 4 is replaced by a magnetic strip made of magnetic tape material and the laser read/write head 3 is replaced by a conventional magnetic tape recorder head. The major advantage of the optical over the magnetic head is that it does not require contact with the encoder. By the way of example, using a value of f=4.5 mm for lens 8 and f=25 mm for cylindrical lens 9, no part comes any closer than 20 mm to encoder 4. It will also be obvious to those skilled in the art that the same principle applies to rotary encoders, as well as linear encoders.

What is claimed is:

1. In a system where position of a moving part is measured relative to a stationary part, a method for correcting position errors by using a writeable position encoder comprising: a laser diode based optical head apparatus mounted on said stationary part and capable of recording permanent marks on a light sensitive material mounted on said moving part when said laser diode is used at a high power level, said optical head capable of detecting but not altering said permanent marks when used at a low power level; means of initially accurately measuring the position of said moving part relative to said stationary part at a plurality of points and causing said optical head to mark said light sensitive material at a plurality of points according to the results of said accurate measurements, said accurate measurements performed only one time to calibrate said position encoder.

2. The writeable position encoder according to claim 1 where said laser diode based optical head apparatus comprises a laser diode; a collimating lens collecting light of said laser diode; a cylindrical lens forming said collected light into a narrow line on the surface of said light sensitive material and a photodetector for detecting said light when reflected from said light sensitive material.

3. The apparatus according to claim 1 where the said laser diode based optical head is mounted on said moving part and the said light sensitive material is mounted on said stationary part.

* * * * *